United States Patent [19]

Maeda et al.

[11] Patent Number: 5,371,730
[45] Date of Patent: Dec. 6, 1994

[54] OPTICAL MEMORY AND INFORMATION PROCESSING APPARATUS

[75] Inventors: Yoshihito Maeda, Mito; Isao Ikuta, Iwaki; Masaichi Nagai, Hitachi; Yoshimi Katou, Takahagi; Hisashi Andoh, Hitachi; Nobuyoshi Tsuboi, Ibaraki; Hiroyuki Minemura, Hitachi; Tatsuya Sugita, Hitachi; Yoshio Sato, Hitachi; Yutaka Sugita, Tokorozawa, all of Japan

[73] Assignee: Hitachi, Ltd., Tokyo, Japan

[21] Appl. No.: 618,980

[22] Filed: Nov. 28, 1990

[30] Foreign Application Priority Data

Nov. 29, 1989 [JP] Japan .................. 1-307715

[51] Int. Cl.⁵ ........................... G11B 23/03
[52] U.S. Cl. ........................... 369/291; 360/133
[58] Field of Search ........... 369/100, 291, 289, 275.5; 360/133, 132, 131

[56] References Cited

U.S. PATENT DOCUMENTS

| | | | |
|---|---|---|---|
| 4,535,434 | 8/1985 | Kiski | 369/291 |
| 4,698,797 | 10/1987 | Komatsu | 369/116 |
| 4,740,447 | 4/1988 | Itoh | 369/284 |
| 4,796,139 | 1/1989 | Faber | 360/133 |
| 4,908,817 | 3/1990 | Sandell et al. | 360/133 |
| 5,077,726 | 12/1991 | Dodds et al. | 369/291 |
| 5,093,174 | 3/1992 | Suzuki et al. | 369/286 |

FOREIGN PATENT DOCUMENTS

| | | | |
|---|---|---|---|
| 59-198546 | 11/1984 | Japan | 369/291 |
| 61-079581 | 5/1985 | Japan | |
| 60-243836 | 12/1985 | Japan | |
| 63-251290 | 10/1988 | Japan | |
| 64-25378 | 1/1989 | Japan | |
| 64-30087 | 1/1989 | Japan | |

Primary Examiner—Paul M. Dzierzynski
Assistant Examiner—Kiet T. Nguyen
Attorney, Agent, or Firm—Antonelli, Terry, Stout & Kraus

[57] ABSTRACT

The invention relates to an optical memory in which an optical recording medium is built in a case, and also to a memory apparatus. Recording, reproducing and erasing operations are performed by irradiating light via a transparent portion of the case onto the built-in optical recording medium. The optical recording medium built in the case has face vibrations with respect to the case, because it is moved within the case. The present invention is characterized by employing such a construction for optically mitigating irregular fluctuation in reflectivity caused by this face vibration. In the optical memory of the present invention, the reflectivity fluctuation caused by an interference effect made between reflection light from the case and air, and also reflection light from the optical recording medium and air due to the relative deviation in the face vibrations, may be reduced by antireflection films provided in the case and the optical recording medium. In a memory apparatus of the present invention, the abovedescribed memory is mounted, the fluctuation in the reflectivity is monitored and laser power is varied in order to further mitigate the reflection vibrations.

23 Claims, 13 Drawing Sheets

F I G. 11A
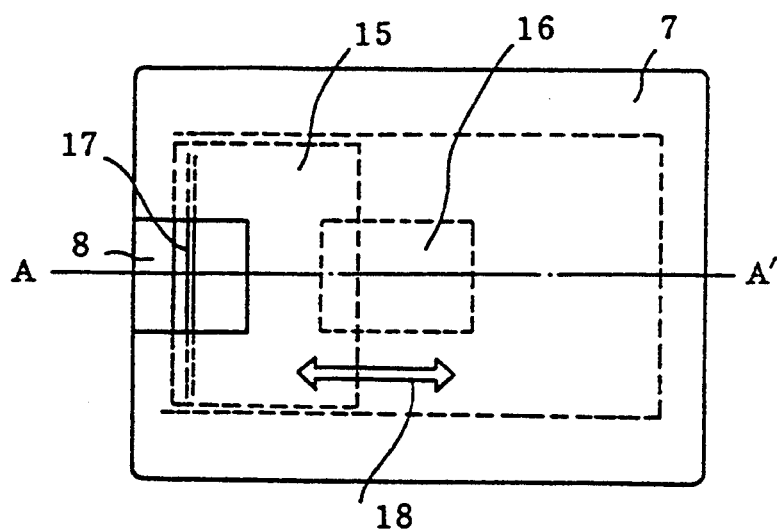
F I G. 11B
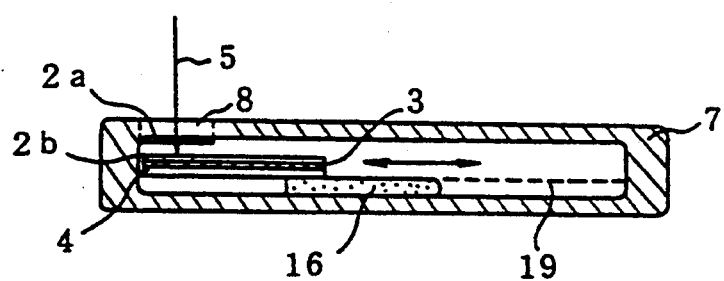

F I G. 15
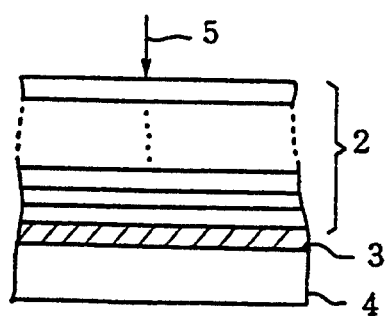
F I G. 16
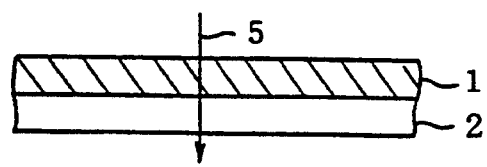
F I G. 17
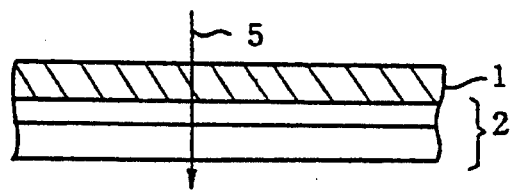

F I G. 18
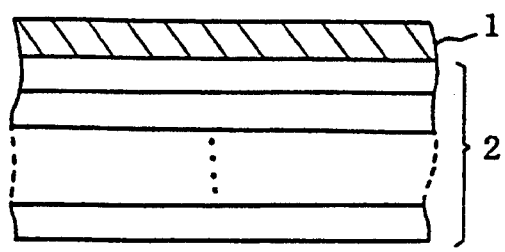
F I G. 19
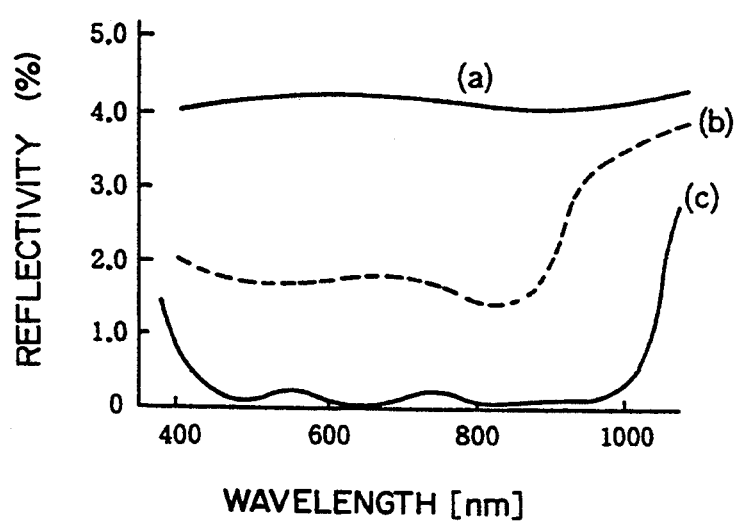

ONE ROTATION OF OPTICAL DISK

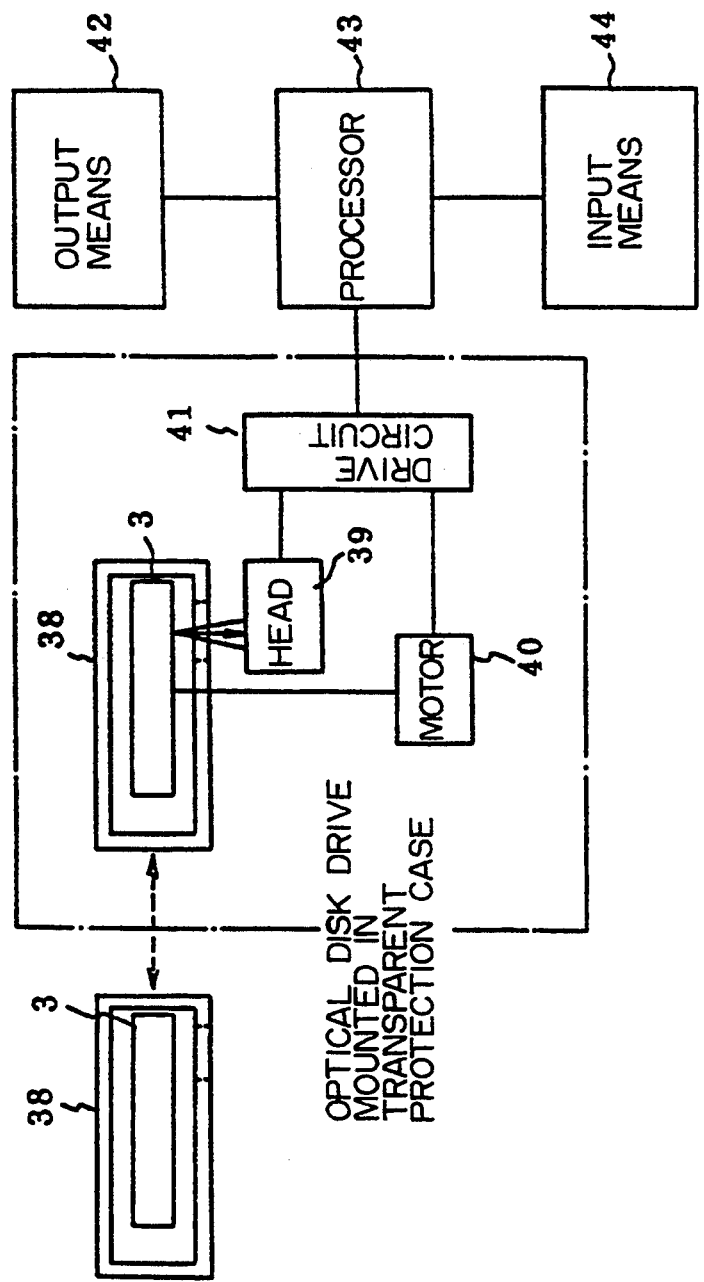

OPTICAL MEMORY AND INFORMATION PROCESSING APPARATUS

BACKGROUND OF THE INVENTION

The present invention relates to an optical memory, such as an optical disk and an optical card for recording, reproducing and erasing information using a laser beam or the like, and also to an information processing apparatus for using said optical memory.

Also, the present invention relates to an optical memory and an information processing apparatus used only for reproducing information previously stored in said optical memory.

In an optical recording medium, such as an optical disk, a laser beam or the like is collected until it reaches a diffraction limit in order to record, reproduce and erase information. As a result, the information can be recorded on such optical recording medium at extremely high density.

Thus, such large capacity-memories have been mainly developed as auxiliary memories for large-scale computers.

On the other hand, small-sized portable computers such as, for instance, lap-top computers, have been marketed very recently, and floppy disks are being presently utilized as typical changeable medium memories for such small-sized computers. However, the memory capacity of the typical floppy disk is rather small. Thus, a strong demand has been currently made for such a high-density memory with a changeable recording medium instead of the floppy disk.

In response to such demands, various types of optical memories have been proposed.

For instance, as to compactness, optical cards having a higher degree of portability have been proposed. Although an optical card has the advantage that a higher portability may be expected with a compact size and a large memory capacity, there is a difficulty that the data transfer speed thereof is very much slower than that of a rotation type optical disk, because both the data recording and reproducing operations are performed with a linear scanning. To solve the above-described difficulty, which is inherent to the optical card, one proposal has been made as described JP-A-60-79581, which is directed to a card in which there is provided a rotation type recording medium sheet, for instance, an optical disk having a thickness substantially equal to the thickness of a conventional cash card. Since data is recorded on the rotation type recording medium sheet in this optical card, there is a particular advantage that a higher data transfer speed may be achieved, as compared with that of the conventional optical card. As a result, this proposed improvement can overcome the above-described problem inherent in the conventional optical card, i.e., low data transfer speed, while other merits such as better portability and easy handling of the typical optical cards are maintained.

On the other hand, the conventional optical disk is mounted within a cartridge case, the shutter capable of being opened/closed is provided on a portion of the case within the disk drive, and the laser light beam is irradiated onto the disk. The reason why such an optical disk is mounted within a cartridge case, is to prevent dust from being deposited on the disk surface and also to realize easy mounting operations in the use of this cartridge case. However, generally speaking, the thickness of a hard cartridge case is rather large and there is a drawback that the total weight of the cartridge case becomes heavy. Therefore, there is a demand to make the cartridge case thinner and lighter. Nevertheless, to make a thinner cartridge case, an optical disk substrate having a typical thickness of 1.2 mm must be made thinner. In general, when a thickness of a substrate becomes thinner, an adverse influence caused by a laser scattering (due to dust deposited on the substrate surface) becomes greater. As a result, this may cause, in turn, other various drawbacks that the laser power during the recording operation is lowered and read-out errors during the reproducing operation may occur. Consequently, the presently available shutter type cartridge case can hardly prevent a dust problem. As one of the possible dust preventing methods, a mechanism has been proposed in JP-A-64-25378 dust is collected by controlling air flows. However, there is no clear description that such a dust preventing method may be similarly applied to the above-described thinner optical disk substrate. For instance, as described in another publication, JP-A-64-30087, a dust preventing idea has been proposed in which the optical disk is sealed within the cartridge case by way of the shutter and the laser light is irradiated through the cover glass formed on the cartridge case onto the surface of the optical disk.

In accordance with the conventional dust preventing ideas as described in JP-A-60-79581 and JP-A-64-30087, to achieve sufficient dust protection with the thinner memory medium, the optical disk built in the cartridge case must be highly sealed, or sufficiently sealed within the cartridge case. To this end, there exists a particular advantage that the laser light is projected via the case cover onto the disk surface, which is different from the conventional system in which the laser light is directly irradiated onto the disk surface.

When, as described above, the optical disk is built in the cartridge case, this case is spatially separated from the optical disk so that a space is necessarily formed therebetween. Air fills this space under normal use. On the other hand, in case that a flexible thin optical disk as described in JP-A-60-79581 and JP-A-64-30087 is mounted so as to be rotated within a case, space intervals between the optical disk and case are continuously varied due to face vibrations of this optical disk, which occur during rotation of the optical disk. In particular, since the face vibrations of the mechanically flexible optical disk become great, such great face vibrations may be suppressed by employing a stabilizer plate as described in JP-A-64-30087. However, it is very difficult to prevent the rotating optical disk from hitting the stabilizer plate, and so the rotating optical disk is set in close proximity to the stabilizer plate for purposes of establishing an air bearing effect therebetween.

SUMMARY OF THE INVENTION

An object of the present invention is not to mitigate face vibration occurring in a built-in optical recording medium, such as an optical disk as provided in the above-described prior art, but to mitigate an irregular fluctuation in the optical characteristic, such as reflectivity of the optical recording medium, which is caused by the face vibration which occurs during recording, reproducing, or erasing.

The present invention is to provision of an optical memory and an information processing apparatus, in which, as previously described, while the memory is made thin, the case is tightly sealed in order to sufficiently achieve a dust-proof property, and the laser light beam is irradiated through the case to a surface of an optical recording medium, such as an optical disk, which is moved with respect to the case, for instance, in a rotating manner, whereby optical recording operations, such as data recording, reproducing, or data erasing, are stably performed.

BRIEF DESCRIPTION OF THE DRAWINGS

FIGS. 5 to 11(A-B) are schematic diagrams showing constructions of an optical memory according to the present invention;

FIGS. 12 to 18 are schematic diagrams representing constructions of antireflection films;

FIG. 19 is a graphic representation showing spectral reflectivity of a case having mixed antireflection films;

FIG. 22 is a characteristic diagram of the card-shaped optical memory according to the present invention;

FIG. 25 is a schematic block diagram of an information processing apparatus.

DESCRIPTION OF THE PREFERRED EMBODIMENTS

An optical memory according to the present invention is characterized by provision of a case, an optical recording medium disposed within the case, and an antireflection film. This optical recording medium is movable within the case, and more specifically is preferable to be rotatably stored within the case. Also, the antireflection film is preferable to be employed on at least one of the case and the recording medium.

Figure 1:
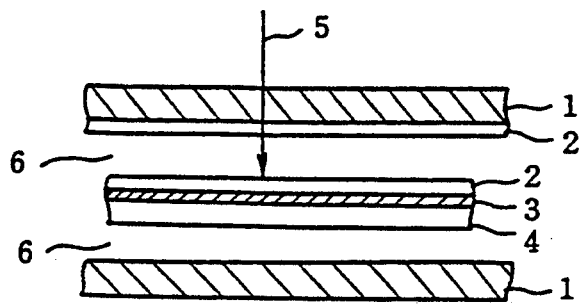
FIG. 1 schematically represents a construction of an optical memory according to the present invention.

As represented in FIG. 1, features of the present invention are as follows. In principle, the optical memory has a superior self-holding characteristic and a better portability, as well as a resistance to environmental pollution, an oilproof characteristic, and a chemical resistance. A construction of the optical memory calls for an optical recording medium 3 to be mounted in a case 1 (including a cartridge form and a card shape) having a transparent portion, the optical recording medium 3 being relatively movable with respect to this case 1, and an antireflection film or coating 2 disposed on the surface of the optical recording medium 3 and/or the case 1. It should be noted that reference numeral 4 shown in FIG. 1 denotes a substrate of the optical recording medium 3; reference numeral 5 indicates an optical path of a laser beam or the like; and reference numeral 6 represents an air layer formed between the case 1 and optical recording medium 3. Although the antireflection films 2 have been formed on both of an interior of the card and the optical recording medium, this antireflection film may be formed on only one of these members. Alternatively, this antireflection film may be formed on an exterior of the card.

An optical memory according to the present invention, includes: a case having a transparent portion which case is made of a material having a self-holding characteristic; an optical recording medium stored within this case, for recording, reproducing and erasing information in response to light illuminated through the transparent portion of the case; and, an antireflection film provided on at least one of the above-described case and optical recording medium along a light path of the light, made of a material through which light can easily pass from the case to the optical recording medium.

The optical recording medium records information on a substrate having a holding characteristic and a plasticity subject to physical or chemical changes in response to the light.

At least one of a dielectric film or metal reflecting film is preferably formed on the optical recording medium.

The optical recording medium may preferably record, reproduce and erase information thereon in such a manner that irradiating light directed thereto causes a phase change in an amorphous-crystal.

As the optical recording medium, a recording medium capable of recording, reproducing and erasing information thereon by utilizing a photo-electro-magnetic effect, may be employed.

The optical recording medium may be relatively moved with respect to the case within the case. Furthermore, it is preferable to rotate the optical recording medium with a substantially constant center axis inside the case.

The optical recording medium may be a disk such as a compact disk for only reproducing information which has previously been recorded.

Assuming now that the refractive index of the transparent portion of the case is "$n_1$", the refractive index of a space between the case and the optical recording medium built in this case is "$n_0$", and the refractive index of a first layer constituting the optical recording, medium with respect to an incident direction of the light is $n_2$, a refractive index "$n_3$" of the antireflection film employed in the case of the optical memory may be preferably, $\sqrt{n_1 n_0}$, whereas a refractive index "$n_4$" of the antireflection film provided on the first layer of the optical recording medium may be $\sqrt{n_2 n_0}$.

As the antireflection film, a condition of $nh = (2m+1)\lambda/4$ may be preferable, assuming now that the of light used for recording or reproducing information is "$\lambda$" the refractive index of the antireflection film is "$n$", the film thickness is "$h$", and "$m$" is an integer.

Also, the antireflection film may be formed by at least two layers having different reflection indexes with an each other, made of dielectric films selected from one of an oxide, fluoride, sulfide and calcogens compound.

Further, the antireflection film may be preferably constructed of a dielectric film made by mixing at least two sorts of an oxide, fluoride, sulfide, chloride and calcogens compound having different refractive indexes.

This antireflection film may be preferably made of a material having higher transmittance than that of the above-described case and optical recording medium.

Also, the light transmittance may be selected to be more than 80 percents.

The optical memory may employ therein at least two recording mediums.

A size of the optical memory may preferably correspond to that of a card, such as a credit card on the like, the outer size thereof being smaller than 110 mm a lateral direction thereof and smaller than 80 mm in a transverse direction thereof. The thickness of the optical memory may be preferably smaller than 3 mm.

An optical memory according to the present invention comprises a case having a transparent portion and made of a material having self-holding characteristics; and an optical recording medium stored in this case, for recording, reproducing and erasing information when irradiated by light via the transparent portion of the case thereon, the transparent portion of the case being made of a material through which the light can easily pass to the optical recording medium.

Transmittance of this transparent portion is preferably higher than 80 percent.

A description will now be made of this antireflection film. The antireflection film must be selected according to the material of the case on which the antireflection film is provided and the material of the optical recording medium. Accordingly, although various materials may be selected, a large light transmittance in proximity to the wavelength of laser light as used for recording-/reproducing information is necessarily required. Preferably, the light transmittance may be selected to be higher than 80 percent, or more than 90 percents. As this antireflection film, both a single layer antireflection film and a multi layer antireflection film may be employed.

Materials capable of being used as the antireflection film are represented in the following list 1.

List 1: Materials usable as an antireflection film fluorides

GeF$_3$, LaF$_3$, MgF$_2$, Na$_3$AlF$_8$, BaF$_2$, SrF$_2$, ThF$_4$, LiF$_2$, CaF$_2$ nitride SiN, AlN oxide CeO$_2$, Fe$_2$O$_3$, Cr$_2$O$_3$, Al$_2$O$_3$, In$_2$O$_3$, La$_2$O$_3$, SiO$_2$, TiO$_2$, Y$_2$O$_3$, ZrO$_2$, Ta$_2$O$_5$ sulfides ZnS Calcogemide compounds ZnSe, PbTe organic resins ultraviolet curableresin, epoxy, acrylic polycarbon These materials are mainly inorganic compounds, such as fluorides, nitrides, oxides, sulfides, calcogens compounds, and organic coating materials such as an ultraviolet curable resin (UV resin). These materials may be employed in a monolayer condition or a multilayer condition.

A method for manufacturing this antireflection film will now be explained.

Various sorts of materials listed in the list 1 are formed on the case and optical recording medium. As manufacturing methods, one may use a vacuum vapor deposition process, sputtering process, applicating process, chemical plating process, electric casting process, printing process and the like. Other manufacturing methods used for normal thin film materials may be utilized.

The antireflection film must be designed so as to be fitted to the refractive indexes of the case and optical recording medium, as previously explained. To this end, materials having the suitable reflection index are required to be employed as the antireflection film. Although the refractive indexes of the materials listed in the list 1 may be fitted to that of the antireflection film to some extent, the refractive index of the antireflection film must be freely controlled in order to precisely suppress the above-described reflection fluctuations.

As a refractive index control method of the antireflection film, it is desirable to employ a method for mixing more than two different sorts of materials each having different refractive indexes with each other so as to control these refractive indexes to a predetermined refractive index. As a mixture method, one may employ a method for setting a multi-simultaneous vapor deposition or sputtering process, a vapor deposition source and a sputter target as a mixture, and further a method for mixing in a solution. In general, a refractive index "n" of a mixed antireflection film is given by Lorentz-Lorentz's formula:

$$n^2 = \frac{\Sigma a_i n_i^2 c_i/\rho_i}{\Sigma a_i c_i/\rho_i}$$

where $a_i = 1/(n_i^2 + 2)$ "$n_i$" indicates a refractive index of a mixed material "i"; "$c_i$" is a weight rate; and "$\rho_i$" represents a density.

Figure 5:
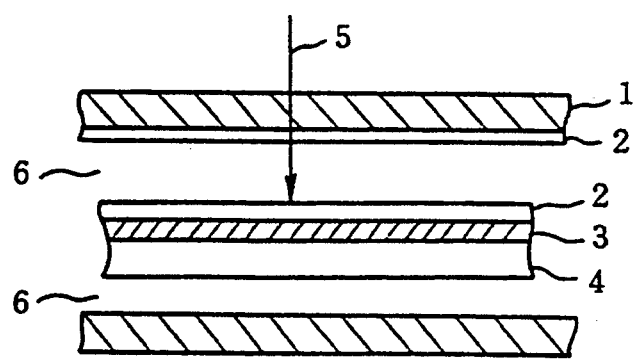

In FIG. 5, there is shown a construction of an optical memory in which an antireflection film 2 is provided only inside a case. Similarly, fluctuation of reflectivity could be suppressed within 8 percent by highly adjusting the refractive index of the antireflection film using this construction. It should be noted that reference numeral 1 denotes a transparent case; reference numeral 3 indicates a recording layer; reference numeral 4 represents a substrate; reference numeral 5 denotes an optical path; and reference numeral 6 represents an air space.

Figure 6:
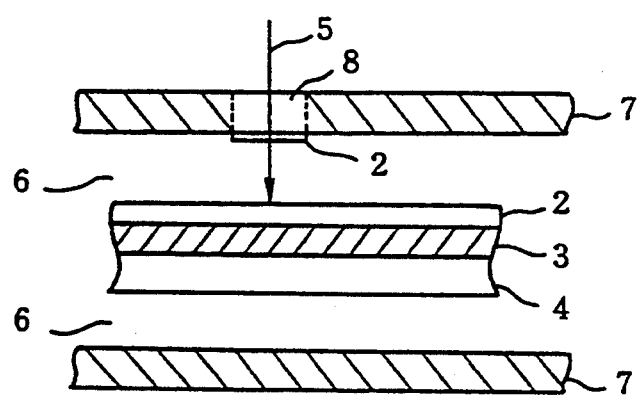

FIG. 6 represents a construction of an optical memory with employment of an opaque case 7. In this construction, there is formed a window 8 (transparent portion) in a portion of the case, upon which laser light is incident, and an antireflection film 2 is provided only on the transparent portion of the case. It should be noted that reference numerals 3 to 6 are similar to those of FIG. 5.

A design of a monolayer antireflection film will now be described. Assuming now that a refractive of the antireflection film is "n"; a thickness of this film is "h" (μm); another refractive index of a case or a laser light incident window (transparent portion of the case) on which the antireflection film is formed is "$n_1$"; and another refractive index of a space between the case and optical recording medium built in the case is "$n_0$", $n\sqrt{n_0 n_1}$ is satisfied based upon an amplitude condition of interference, or $nh = (2m+1)\lambda/4$ is satisfied based on a phase condition, where "m" denotes an integer, and "λ" represents a wavelength (μm) of laser light used for recording/reproducing operations. A similar designing idea may be applied to the antireflection film employed in the optical recording medium.

Although a complex designing idea is required for a multilayer antireflection films a generic designing policy for two layers and three layers will now be explained.

The following two typical models are available for a two-layer antireflection film having refractive indexes of $n_2$ and $n_3$.

$\lambda/4(n_3) - \lambda/4(n_2)/\text{case } (n_1)$ model.     ①

Symbol "λ" represents a wavelength of laser light. In this case, optical film thicknesses $n_2h_2$ and $n_3h_3$ of the two-layer antireflection film are preferably equal to λ/4. Symbols "$h_2$" and "$h_3$" are film thicknesses of the antireflection film.

$$\lambda/4(n_3)-\lambda/2(n_2)/\text{case }(n_1)\text{ model.} \qquad (2)$$

In this case, the optical film thicknesses $n_2h_2$ and $n_3h_3$ of the two-layer antireflection film are equal to λ/4 and λ/2, respectively.

In a three-layer antireflection film having the refractive indexes $n_2$, $n_3$ and $n_4$.

$$\lambda/4(n_3)-\lambda/2(n_2)-\lambda/4(n_4)/\text{case} \qquad (3)$$

It should be noted that $n_2 > n_4 > n_3$. In this case, $n_3{}^2 n_1 = n_4{}^2$ must be satisfied and these refractive indexes are equal to $\lambda/4 = n_3 h_3$ and $\lambda/4 = n_4 h_4$.

As the materials for the recording film of the optical recording medium, materials such as metal films, organic colors, calcogenide compounds, magnetic thin films and an inorganic chloride which respond to light or heat produced by light irradiation are preferable. In particular, a material in which an amorphous-crystal phase change may occur and a material having a rewritable capability by way of the photo-electromagnetic effect may be preferable.

As previously described, the optical memories provided with the antireflection film are advantages for achieving the object of the present invention. An apparatus for mitigating the fluctuation in the reflectivity caused by the face vibrations of the relevant optical recording medium, according to a system of the present invention, will now be described.

In an optical memory, both a focusing operation for correctly collecting a laser beam onto a medium plane and a tracking operation for precisely tracing the laser beam onto a recording track are required while recording, reproducing or erasing data. To this end, the light reflected from the medium plane is returned to a detector and then a servo control is performed in which a condenser lens is fine-moved by an actuator or the like in response to output values of the detectors.

Accordingly, if, as previously described, the fluctuation in a reflectivity of the medium happens to occur, a satisfactory servo control can be hardly expected. Therefore, there is a necessity to monitor such a fluctuation reflectivity in order to suppress this fluctuation in the system.

In an optical memory according to the present invention, there are employed a case having a transparent portion, which case is made of a material with a self-holding characteristic; and an optical recording medium stored within the case, in which a recording layer for recording, reproducing and erasing information in response to light irradiated through the transparent portion of the case is formed on a transparent substrate, the transparent substrate being made of a material through which the above-described light can more easily pass as compared to the transparent portion of the case.

The transmittance of this transparent portion of the case is preferably higher than 80 percent.

In an optical memory according to the present invention, there are employed a case having a transparent portion, which case is made of a material with a self-holding characteristic; and an optical recording medium stored within the case at an internal plane which is separated from the case by an air layer, for recording, reproducing and erasing information by receiving light irradiated through the transparent portion of the case, and an antireflection layer, the reflectivity of which at a boundary plane between the optical recording medium and the air layer becomes below 4 percent, and/or an antireflection layer, the reflectivity of which at a boundary plane between the transparent portion of the case and the air layer becomes lower than 4 percent, is employed within the optical path.

An information processing apparatus, according to the present invention, is characterized by an optical head, a memory which includes an optical recording medium rotatably disposed within a case having a transparent portion, and an antireflection film formed on at least one of said case and said optical recording medium. The recording of information on said optical recording medium is effected by irradiating light thereon through the transparent portion of the case; while reproducing of the information which has been recorded on said optical recording medium and erasing of the information which has been recorded on said optical recording medium also employs light directed through the transparent part of the case.

A variation in reflectivity of light reflected from the above-described optical recording medium is preferably selected to be smaller than 5%. Furthermore, it is preferable to employ a circuit for correcting the variation in the reflectivity of the light reflected from the optical recording medium.

A drive for the optical recording medium may take the form of a spindle motor, flat motor, linear motor and ultrasonic actuator for rotating or performing a parallel motion of the optical recording medium with respect to the case.

The optical head preferably includes a semiconductor laser, a collimation lens, an object lens, a focusing actuator, a photodiode, prisms, a mirror, a tracking actuator, a ¼λ plate and an opto-acoustic element.

Both of the optical head and optical memory employed in the information processing apparatus according to the present invention may be used exclusively for reproducing operation.

Also, the information processing apparatus according to the present invention may include a circuit for correcting fluctuation in reflectivity of the light reflected from the optical recording medium, instead of the means for lowering an amount of reflectivity of the light reflected from the optical recording medium.

In an information recording method according to the present invention, light is irradiated onto an optical recording medium movably stored within a case having a transparent portion and made of a material with a self-holding characteristic via a transparent portion of the case, whereby information is recorded, reproduced and erased on and from the optical recording medium, and also the light is irradiated through an antireflection film on a light path of the light, which is formed on at least one of the above-described case and optical recording medium, and is made of a material the transmittance of which is higher than 80 percent.

In an information reproducing method according to the present invention, light is irradiated onto an optical recording medium movably stored within a case having a transparent portion and made of a material with a self-holding characteristic via a transparent portion of the case, whereby the information previously recorded on this optical recording medium is reproduced, the light is irradiated on a light path of the light via an antireflection film which is formed on at least one of the case and optical recording medium and is made of a material the transmittance of which is higher than 80 percent.

The antireflection film employed in the information processing apparatus according to the present invention is designed to prevent or suppress interference of light caused by the air layer. The light interference caused by this air layer becomes a noise with respect to a signal. Accordingly, this antireflection film may also be referred to as "a light interference suppressing film".

Furthermore, this antireflection film may be preferably formed on both of the case and recording medium.

Also, this antireflection film may be made of a transparent material, and may have a refractive index different from that of the case and optical recording medium.

Then, the case may be relatively moved with respect to the optical recording medium in accordance with the present invention. More specifically, the optical recording medium may be rotatable within the case.

Also, an optical memory according to the present invention comprises:

a case having a transparent portion and made of a material with a self-holding characteristic; and, an optical recording medium rotatably stored within the case via an internal plane of the case and an air layer, for performing at least one of recording, reproducing and erasing operations for information by light irradiated through the transparent portion of the case, characterized in that a light interference suppressing film for suppressing interference of said light at the air layer is provided in a light path of the light in at least one of the internal plane of the case and a plane in contact with the air layer of the optical recording medium.

In an optical memory according to the present invention, comprising a case having a transparent portion and made of a material with a self-holding characteristic; and an optical recording medium stored within the case, and relatively moved with respect to the case, for reproducing and recording/reproducing information, or recording/reproducing/erasing the information by light irradiated through the transparent portion of the case, a thin film having a refractive index different from that of said case is formed on at least a side plane of the case in a light path of said light of both said case and optical recording medium, and also a thin film having a refractive index different from that of a transparent substrate to constitute said optical recording medium or that of a transparent thin film provided on an outermost layer is formed on said substrate or outermost layer thin film.

Further, in an optical memory according to the present invention, comprising a case having a transparent portion and made of a material with a self-holding characteristic; and an optical recording medium stored within the case, and relatively moved with respect to the case, for reproducing and recording/reproducing information, or recording/reproducing/erasing the information by light irradiated through the transparent portion of the case, a thin film having transmittance greater than that of said case is formed on at least one side plane of the case in an optical path of the light of both the case and optical recording medium, and also a thin film having transmittance greater than that of a transparent substrate to constitute said optical recording medium, or that of a thin film provided on an outermost layer is formed on said transparent substrate or thin film of the outermost layer.

In the optical memory according to the present invention, comprising a case having a transparent portion and made of a material with a self-holding characteristic; and an optical recording medium stored via an air layer within the case, and relatively moved with respect to the case, for reproducing and recording/reproducing information, or recording/reproducing/erasing the information by light irradiated through the transparent portion of the case, a thin film having a refractive index different from that of said case is formed on at least a side plane of the case in a light path of said light of both said case and optical recording medium so as to set reflectivity at a boundary plane with said air layer to be lower than 4%, and also a thin film having a refractive index different from that of a transparent substrate to constitute said optical recording medium or that a transparent thin film provided on an outermost layer is formed on said substrate or outermost layer thin film.

An information processing apparatus according to the present invention comprises:

an optical memory in which an optical recording medium for optically recording, reproducing, or erasing information is movably stored within a case having a transparent portion;

an optical head for recording, reproducing, or erasing the information on said recording medium;

means for setting a variation in a reflection amount of light to be lower than 5%, which is projected from said optical head and reflected from said optical recording medium;

means for driving said optical recording medium; and, a drive circuit for controlling both operations of said optical head and a rotation number of said drive means.

An information processing apparatus according to the present invention comprises:

an optical memory in which an optical recording medium for optically recording, reproducing, or erasing information is movably stored within a case having a transparent portion;

an optical head for recording, reproducing, or erasing the information on said recording medium;

correcting means for correcting a variation in a reflection amount of light to be lower than 5%, which is projected from said optical head and reflected from said optical recording medium;

means for driving said optical recording medium; and, a drive circuit for controlling both operations of said optical head and a rotation number of said drive means.

Also, an optical memory, according to the present invention, comprises an optical recording medium rotatably disposed within a case; and, a film for suppressing interference of light occurring in an air layer formed between the case and the optical recording medium. In this optical memory, the interference suppressing film is preferable to be provided on at least one of a plane between the air layer of the case and this suppressing film, and also another plane between the air layer of the recording medium and this suppressing film. Also, the refraction index of the case is preferably different from that of the optical recording medium.

In accordance with the present invention, the antireflection films provided with the case and optical recording medium have effects to reduce the variation in the reflectivity which is caused by the optical recording medium built in the case when being relatively moved with respect to the case. Further, the information is recorded, reproduced and erased by the information processing apparatus including the correcting circuit for monitoring the variations in the reflectivity of the medium, so that the stable recording and reproducing operations with the small variation of the reflectivity can be realized.

Irregular variations in the optical characteristics such as reflectivity caused by the face vibrations of the optical recording medium movable within the case during the recording, reproducing, or erasing operations will now be described.

Figure 2A:
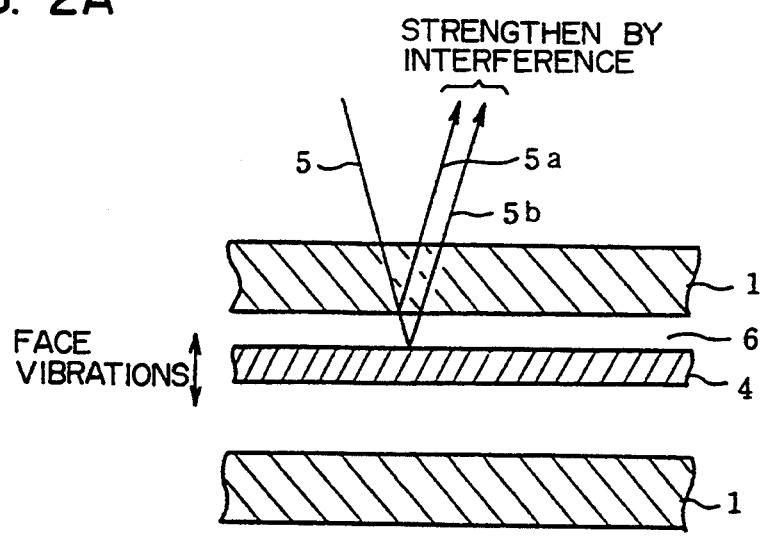
FIGS. 2A and 2B are illustrations showing for principle of fluctuation in reflectivity caused by face vibrations.
Figure 2B:
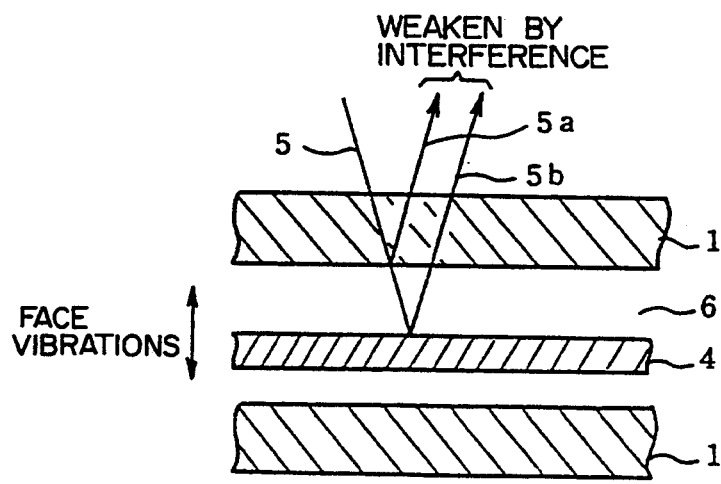

In FIGS. 2A and 2B, there are shown the variations in the reflectivity caused by the face vibrations. To achieve a better data transfer speed than that of the presently available floppy disk, an optical memory must be designed such that, assuming now that a diameter of an optical disk 4 built in the optical memory is selected to be 2 inches (approximately 50 mm), for instance, this optical disk 4 must be rotated at a rotating speed on the order of 3600 rpm. When the optical disk 4 is rotated at such a high speed within the case 1 under a substantially sealed condition, a pressure difference may occur within the case 1 due to the face that a velocity difference may exist between an inner periphery and an outer periphery of the disk 4. Then this pressure difference may induce face vibrations of the optical disk. There are other face vibrations caused by center vibrations of the spindle for driving the optical disk. As described above, when the optical disk is rotated within the case, face vibrations may occur. Accordingly, this may cause the spacing between the case and optical disk to be continuously, irregularly varied. FIG. 2A shows such a condition that the optical disk 4 is positioned in close proximity to the case 1, whereas FIG. 2B shows such a condition that the optical disk 4 is most separated from the case 1. Laser light 5 incident on the case perpendicular to the case (not that an incident angle thereof has been changed for the sake of convenience) produces one reflection light 5a which has reflected at a boundary plane between the case and a space 6 within the case, and the other reflection light 5b which has reflected at a boundary plane between the optical disk 4 and the space 6. In the figures, both the reflection light at the surface of the case 1 and the reflection light coming from the inside of the optical disk 4 containing the data have been omitted. Considering now a case shown in FIG. 2A where an interference condition for strengthening the reflection light 5a and 5b with each other is satisfied, and a case shown in FIG. 2B where an interference condition for weakening the reflection light 5a and 5b with each other is satisfied, since the interference condition is continuously changed due to the face vibrations of the optical disk, the reflection light 5a may be strengthened or weakened with the reflection light 5b. This fact may cause noise when a variation in the reflectivity during the recording and reproducing operations of the optical disk is detected. Accordingly, if both the reflection light 5a and 5b is reduced, the overall variation of the reflectivity may be lowered.

Figure 3:
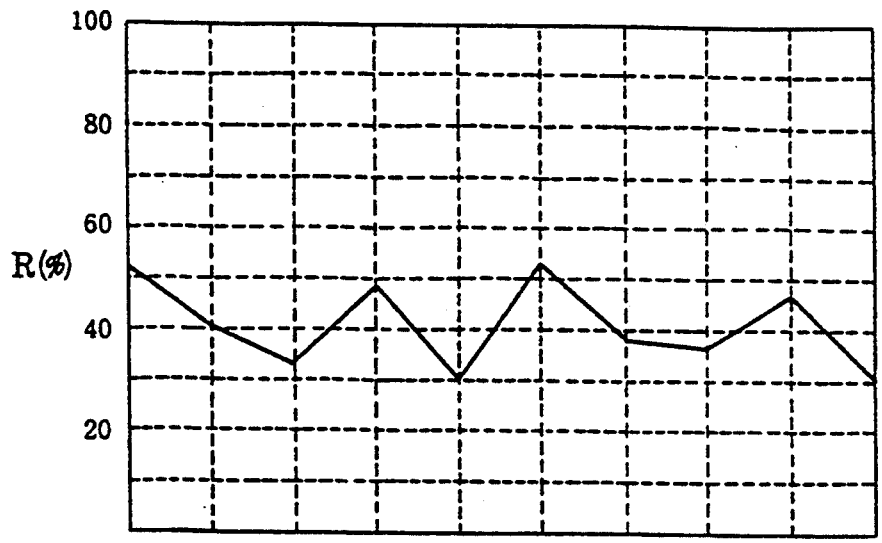
FIGS. 3, 4 and 22 represent the fluctuation in reflectivity caused by face vibrations.

In FIG. 3, there is shown a variation in reflectivity when an optical memory is reproduced. An amount of face vibrations produced while the optical recording medium (in this case, an optical disk) built in the optical memory was rotated within 1 rotation, was 10 μm at maximum. At this time, the variation in the reflectivity became 22% at maximum, under which the normal recording and reproducing operations could not be realized. Accordingly, to achieve stable recording and reproducing operations by irradiating the laser light via the case onto the optical recording medium built in the case, the fluctuation in the reflectivity caused by the face vibration of the optical recording medium must be solved. To this end, the optical memory according to the present invention includes such a construction capable of mitigating the fluctuation in the reflectivity.

Figure 4:
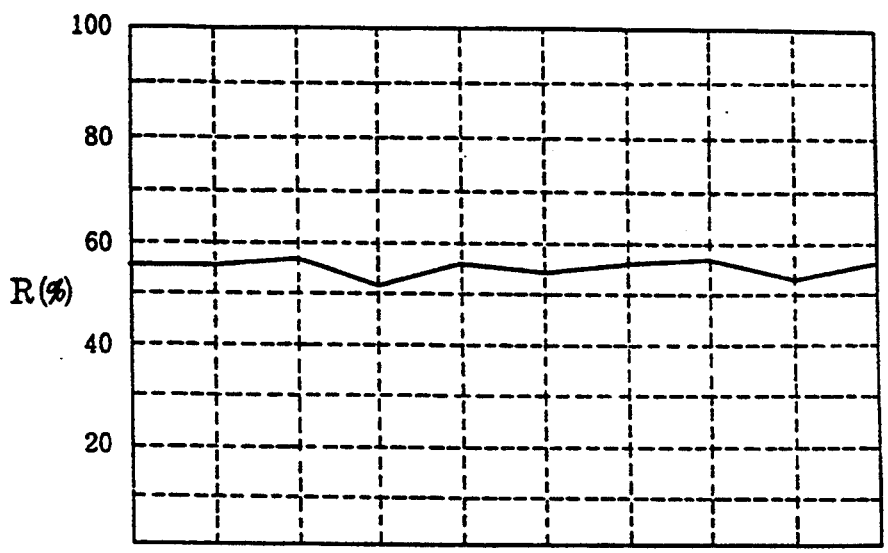

FIG. 4 represents fluctuation in reflectivity when an antireflection film has been employed in the optical memory shown in FIG. 3. The fluctuation in the reflectivity could be suppressed below 5%, as compared with that of FIG. 3.

This implies that since the antireflection films are provided with the case and optical recording medium at a side of a laser incident reflection, the reflection light 5a and 5b shown in FIG. 2A and 2B are attenuated. Precisely speaking, to attenuate the reflection light reflected from a surface of the case, which is not represented in FIGS. 2A and 2B, another antireflection film may also be provided on the case surface. However, even if no such an antireflection film is provided on the case surface, there is no practical problem.

In other words, according to the optical memory of the present invention, providing the antireflection films or coatings enables' the reflectivity fluctuation during the recording/reproducing operations to be mitigated even when the face vibrations of the optical recording medium may happen to occur. An information processing apparatus according to the present invention can achieve stable recording and reproducing operations by correcting the reflectivity fluctuation by a correcting circuit and the like.

The optical memory and information processing apparatus according to the present invention, may mitigate the fluctuation in the reflectivity caused by the face vibrations due to movement of the optical recording medium built in the case, and also may realize a stable optical recording characteristic of the optical memory.

In accordance with preferred embodiments, the present invention has been embodied as an optical disk which is a typical example of the optical recording medium.

(Embodiment 1)

Figure 7:
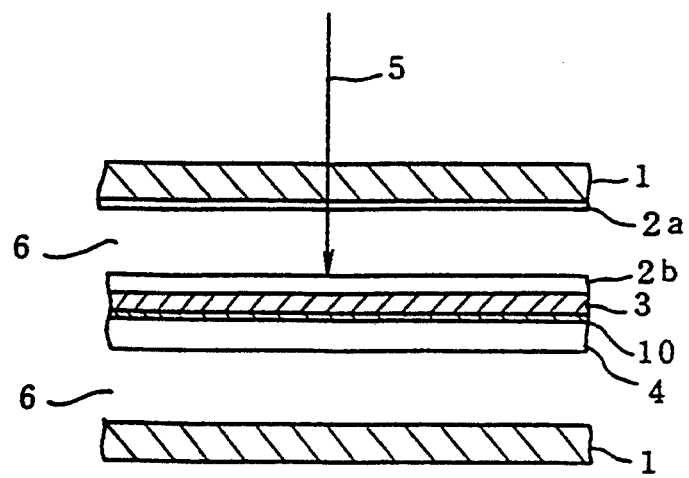

FIG. 7 represents a construction in which antireflection films 2a and 2b are provided on a case and an optical recording medium. Inside the case 1 having a thickness of 2 mm and made of an acrylic resin, the antireflection film 2a made of MgF$_2$, having a thickness of 16 mm, was formed by a sputtering process. Furthermore, the antireflection film 2b made of CeO$_2$, having a thickness of 100 nm, was formed by a sputtering process on a naphthacyanine organic dye recording film 3 which has been coated on a glass substrate 4 forming an Au reflection film 10. In accordance with this preferred embodiment, fluctuation in reflectivity was within 5% while the optical disk built in the optical memory was rotated, and a stable recording/reproducing characteristic be achieved by utilizing a semiconductor laser having a wavelength of 830 nm. Also, as a secondary effect, near ultraviolet radiation was shielded by the case and therefore the environment resistance of the organic recording medium could be improved. It should be noted that reference numeral 5 indicates a light path and reference numeral 6 denotes a space.

(Embodiment 2)

Figure 8:
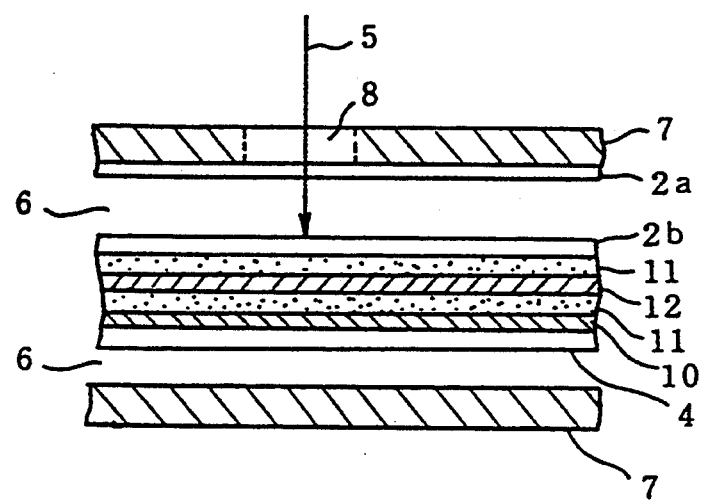

In FIG. 8, there is shown a construction that the antireflection films 2a and 2b are provided on a case and an optical recording medium. A transparent acrylic resin window 8 upon which laser light is incident was formed in a case 7 made of an opaque polystyrene resin and having a thickness of 2 mm, and then the antireflection film 2a made of MaF$_2$, having a thickness of 160 nm was formed by a sputtering process. The optical disk built in the optical memory was so constructed that an Au reflection film 10 having a thickness of 100 nm, a ZnS dielectric film 11 having a thickness of 70 nm, the above-described In$_3$SbTe$_2$ ternary compound recording film 12 having a thickness of 30 nm, a ZnS dielectric film having a thickness of 70 nm, and also an SiO$_2$ antireflection film 2b having a thickness of 140 nm were successively formed on the glass substrate 4 by way of the sputtering process. In accordance with this preferred embodiment, while rotating the optical disk built in the optical memory at a rotation speed of 3600 rpm by employing a semiconductor laser having a wavelength of 830 nm, the fluctuation in the reflectivity was within 5%, stable recording/reproducing/erasing characteristics with higher C/N could be realized, and furthermore, an overwrite operation could be achieved. It should be noted that reference numeral 5 indicates a light path and reference numeral 6 denotes a space.

(Embodiment 3)

Figure 9:
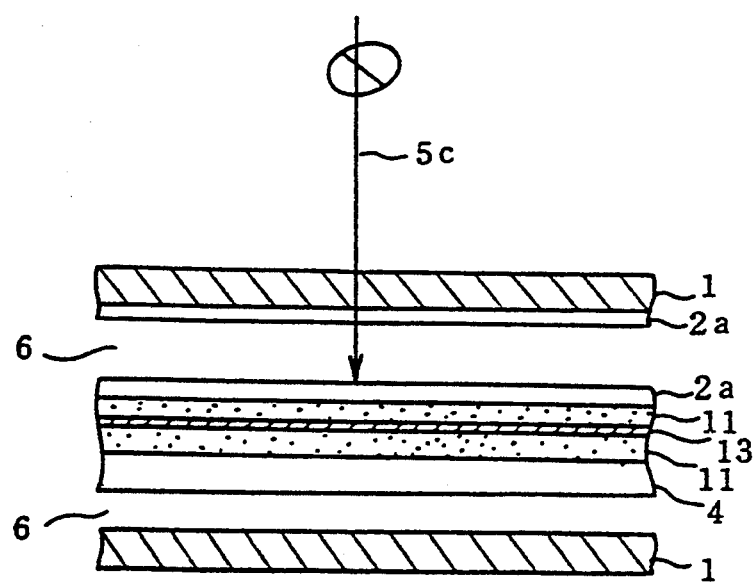

FIG. 9 shows such a construction in which the antireflection films 2a and 2b are formed on a case and an optical recording medium. Inside a case 1 having a thickness of 2 mm and made of a transparent acrylic resin, the antireflection film 2a made of MgF$_2$, having a thickness of 160 nm was formed by a sputtering process. An optical disk built in the optical memory was so constructed that an Al dielectric film 11 having a thickness of 100 nm, a TbFeCo Magneto-optical recording film 13 having a thickness of 50 nm, an AlN dielectric film having a thickness of 100 run, an SiO$_2$ antireflection film 2b having a thickness of 140 nm were successively formed on the glass substrate 4 by the sputtering process. By using a semiconductor laser 5c having a wavelength of 830 nm, which has been linearpolarized by an analyzer, the photo-electro-magnetic disk built-in the optical memory according to this preferred embodiment is rotated at a rotating speed of 3600 rpm, so that the fluctuation in the reflectivity was within 1% and stable recording, reproducing and erasing characteristics could be realized. From these conditions, it could be recognized that the present invention also has a particular advantage in an optical memory with employment of a Magneto-optical recording disk the reflectivity of which is not directly detected. It should be noted that reference numeral 6 indicates a space.

(Embodiment 4)

Figure 10:
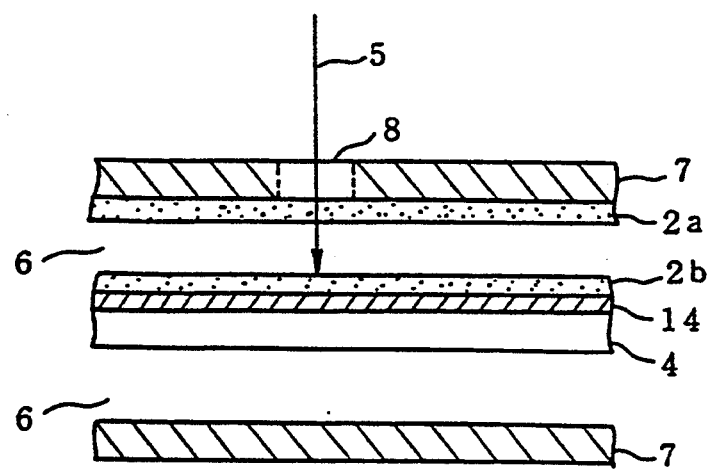
Figure 12:
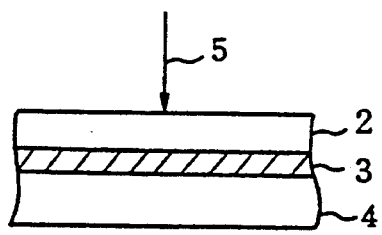
Figure 13:
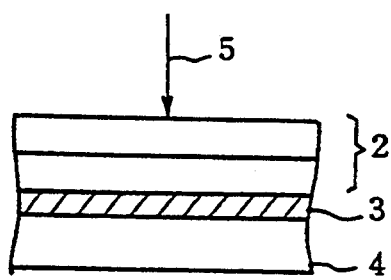
Figure 14:
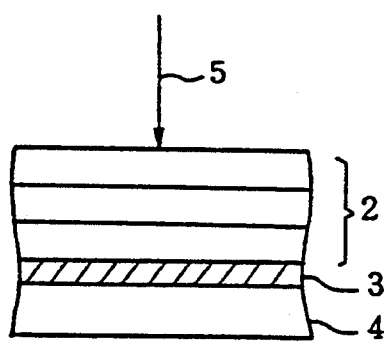

In FIG. 10, there is shown an optical memory according to another preferred embodiment, in which an Na$_3$AlF$_6$ antireflection film 2a having a thickness of 160 nm has been formed by vacuum vapor deposition on a transparent acrylic resin window 8 which was formed at a portion of a polystyrene resin case 7 having a thickness of 2 mm. Reference numeral 14 indicates an Al layer (compact disk layer) having a thickness of 100 nm on which data have been previously recorded; reference numeral 4 indicates a glass substrate; and reference numeral 2b denotes a ZnS antireflection film having a thickness of 150 nm. When the optical disk built in this optical memory was rotated at 600 rpm, a stably reproduced signal with small fluctuation could be produced.

It should be noted that reference numeral 5 indicates a light path and reference numeral 6 represents a space.

(Embodiment 5)

FIGS. 11a and 11b represent a construction of an optical memory according to one preferred embodiment of the present invention, in which a card-shaped memory is built in a polystyrene resin case 7 having a thickness of 0.2 mm. FIG. 11b is a cross-sectional view taken along a line A—A' shown in FIG. 11a. As the construction of the built optical card, the constructions described in Embodiments 1 to 4 may be employed. A feature of this preferred embodiment is that a card-shaped memory 15 is driven within the case in a translation mode 18. This translation drive may be realized by magnetically connecting a magnet hub 16 (not shown) employed therein to a drive apparatus. Laser light 5 is irradiated onto a surface of the card-shaped memory 15 via a transparent acrylic window 8 which has been formed on a portion of the case, so as to record/ reproduce data thereon/therefrom. A high speed data accessing operation may be realized by the translation movement according to this preferred embodiment. Also in this translation movement, both an MgF$_2$ antireflection film 2a and a CeO$_2$ antireflection film 2b have an effect to mitigate the reflectivity fluctuation. It should be noted that reference numeral 4 indicates a substrate; reference numeral 3 denotes a recording film; reference numeral 17 represents a recording unit; and reference numeral 19 shows a cadmium layer.

(Embodiment 6)

FIGS. 12 to 15 represent structures of antireflection films according to preferred embodiments provided on the optical recording mediums. The antireflection film 2 was provided at an incidence side of laser light 5 for the optical recording medium. In the structure shown in FIG. 12, ZnS, ZrO$_2$ and TaO$_5$ monolayer antireflection layers represent particular advantages. Similarly, in the structure shown in FIG. 13, SiO$_2$/ZnS, and CeO$_2$/Y$_2$O$_3$ two-layer antireflection films exibit particular advantages. In the structure shown in FIG. 14, a ZnS/MgF$_2$/SiO three-layer antireflection film has a particular advantage. In a construction of a multilayer antireflection film larger than the three-layer antireflection film, as shown in FIG. 15, such a construction that a 3-layer period of ZnS/MgF$_2$/SiO is stacked by 10 periods represents a particular advantage.

(Embodiment 7)

FIGS. 16 to 18 represent structures of antireflection films 2 according to preferred embodiments of the present invention, employed in the case 1. In the structure shown in FIG. 16, MgF$_2$, CaF$_2$, BaF$_2$, ThF$_4$ and LiF monolayer antireflection films exhibit particular advantages. In the structure shown in FIG. 17, MgF$_2$/ZnS and CaF$_2$/Y$_2$O$_3$ two-layer antireflection films have particular advantages. In the structure of the multilayer antireflection film higher than the two-layer antireflection film such a construction that an LaF$_2$/MgF$_2$/SiO three-layer period is stacked by 5 periods has a particular advantage.

(Embodiment 8)

As represented in Embodiments 6 to 7, the structures of the antireflection films exhibit particular effects by stacking substances each having a different refractive index. In accordance with this preferred embodiment, a mixture film is made of substances having different refractive indexes with each other as an antireflection film. The antireflection film to be formed on an acrylic resin case was fabricated by a vacuum vapor deposition process with employment of a vapor source by mixing $ZrO_2$ with $MgF_2$. FIG. 19 graphically represents an antireflection effect achieved by this preferred embodiment.

FIG. 19(a) represents spectral reflectivity of a surface of an acrylic resin case having no antireflection film; FIG. 19(b) indicates spectral reflectivity of a case having $ZrO_2$ and $MgF_2$ two-layer antireflection films; and, FIG. 19(c) denotes spectral reflectivity of a case employing the mixed antireflection film according to this preferred embodiment. From the reflectivity characteristics shown in FIG. 19, it may be understood that the mixed antireflection film according to this preferred embodiment has the best advantages.

(Embodiment 9)

Figure 20A:
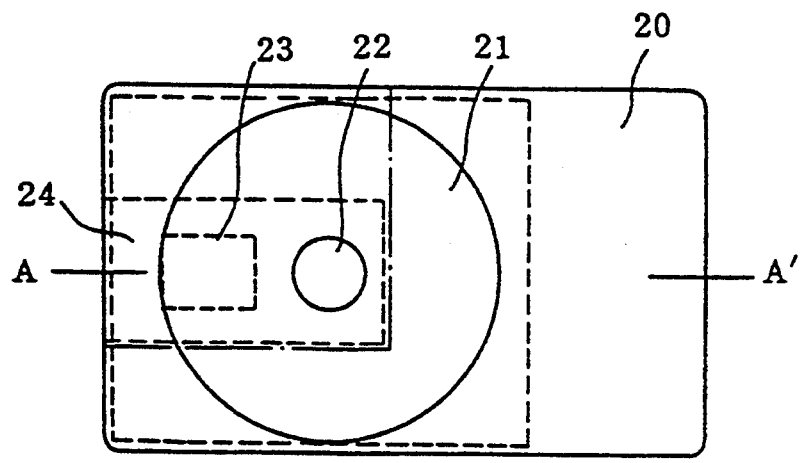
FIGS. 20(A-B), 21, 23A, and 23B are schematic diagrams showing a construction of a card-shaped optical memory.
Figure 20B:
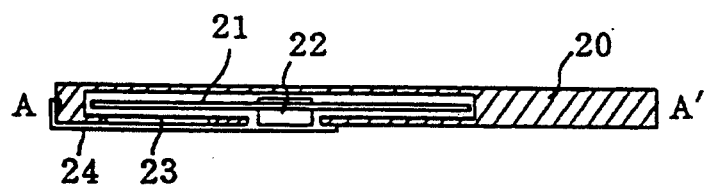

FIGS. 20A and 20B represent examples of the optical memory according to the present invention. As shown in FIG. 20A, this example is constructed of a transparent card-shaped case 20 having a thickness of 0.5 mm and made of polysulfone; an optical disk 21 built therein having a diameter of 130 mm; a stainless hub 22 fixed with an external drive apparatus for rotating the optical disk 21; a laser projection window 23 made of polycarbon, for projecting the laser light so as to externally record, erase and reproduce; and a stainless sliding type shutter 24 for dust-proofing the laser projection window 23 and fixing hub 22. This card has a thickness of 1.5 mm, a lateral length of 85 mm and a transverse length of 53 mm. FIG. 20B is a sectional view, take along a line A—A' shown in FIG. 20A. As represented in this sectional view, the optical disk 22 has a space defined between the card-shaped case 20 and this disk 22. However, the optical disk 22 may be in contact with the case face during the rotation of the optical disk 22.

Figure 21:
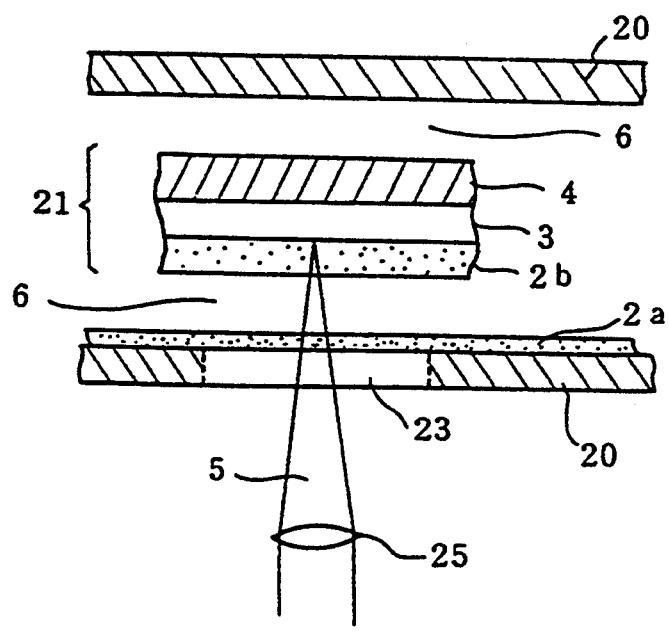

In FIG. 21, there are shown a detailed construction of the optical disk built in the card-shaped case and also a positional relationship of this optical disk in the sectional direction. Reference numeral 20 shown in FIG. 21 indicates a card-shaped case; reference numeral 21 indicates an optical disk; reference numeral 23 represents a laser projection window; reference numerals 2a and 2b indicate an $MgF_2$ antireflection film having a thickness of 160 nm which has been formed on the card-shaped case and laser projection window, and another $ZrO_2$ antireflection film 2b having a thickness of 100 nm provided on the disk 21 in the laser projection direction, respectively, reference numeral 3 indicates an $In_3SbTe_2$ ternary compound recording film having a thickness of 30 nm (note that this film may be selected from not only $In_3SbTe_2$, but also other materials mentioned in JP-A-No. 63-251290) capable of recording/erasing information by irradiating laser light therein, whereby an amorphous-crystal phase change occurs; reference numeral 4 denotes a stainless circular substrate having a thickness of 0.03 mm; reference numeral 25 indicates an optical system such as an object lens for collecting the laser light 5 onto the optical disk 21; and reference numeral 6 denotes an air layer necessarily formed between the card shaped case and optical disk.

Figure 22:
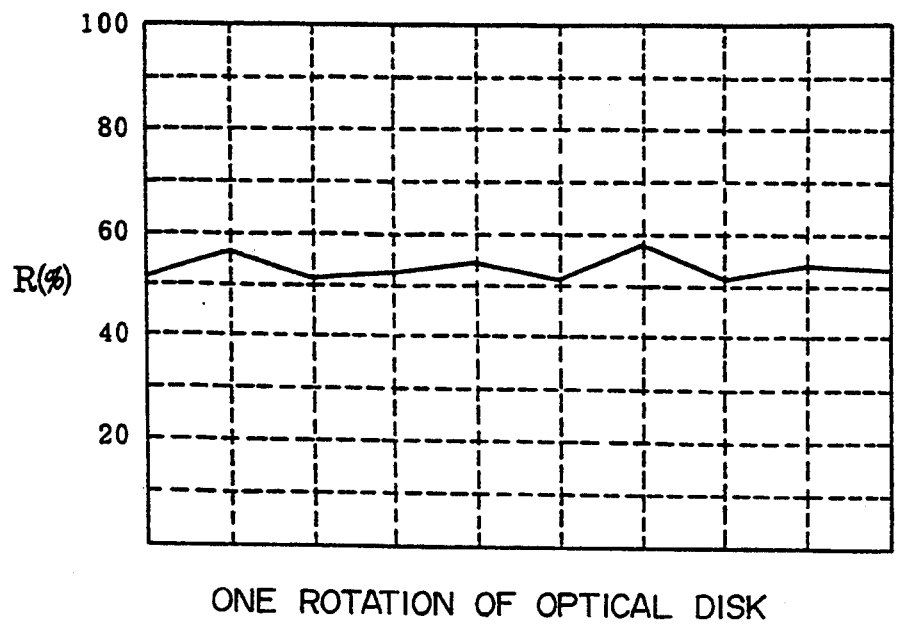
Figure 23A:
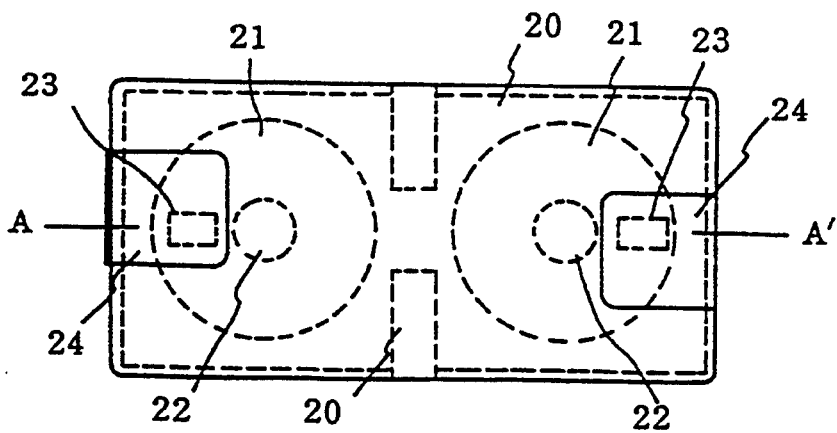
Figure 23B:
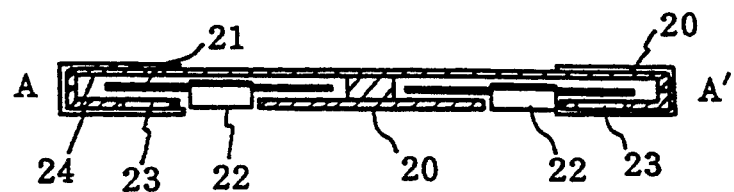

In FIG. 22, there is shown a fluctuation in reproduced signals (corresponding to the reflectivity of the card) derived from a mirror unit for focus-controlling the laser beam and servo-controlling the tracking operation when the optical disk employed within the card is rotated at a rotation speed 3600 rpm. As apparent from FIG. 22, it can be seen that the reflectivity fluctuation in the card according to the present invention is considerably reduced. To achieve stable focusing and tracking operations of the laser light on the optical recording medium, it may be easily understood that the fluctuation in the reflectivity of the mirror unit is reduced as small as possible. Also, in the card according to the present invention, the recorded signal could be reproduced under condition that C/N corresponds to 50 dB. As previously stated, it could be proved that setting the antireflection films 2a and 2b must be required in the card in which the rotation type optical disk has been formed. Furthermore, as shown in FIG. 23, in accordance with the present application example, the data transfer speed can be easily improved by employing two sheets of the built-in optical disk and by over-writing a data in the parallel and simultaneous fashion, and recording/reproducing the data in a parallel form. It should be noted that reference numerals employed in FIG. 23 are the same as those employed in FIG. 20.

Figure 24A:
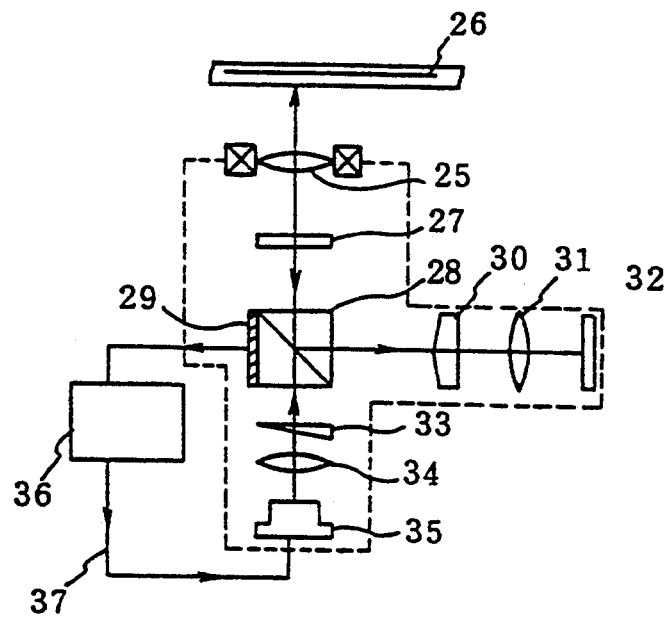
FIGS. 24A and 24B are schematic diagrams of the optical head and optical disk, and also a control diagram thereof.
Figure 24B:
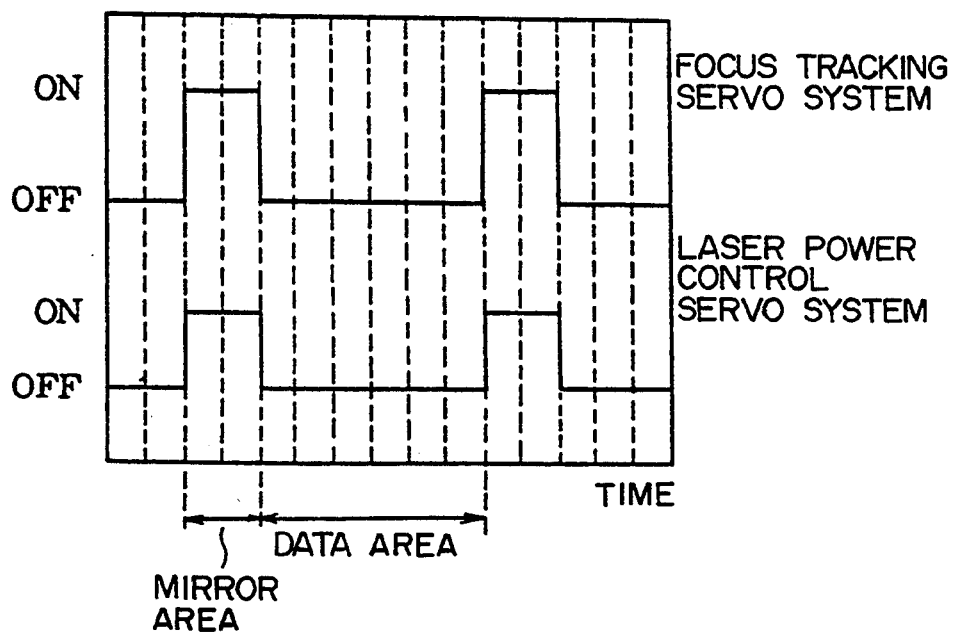

FIGS. 24A, 24B and 25 represent an information processing apparatus according to a preferred embodiment of the present invention. As described in the specification, a feature of this information processing apparatus is to employ a mechanism for mitigating the fluctuation in the reflectivity of the optical memory caused when the recording and reproducing operations are carried out. FIG. 24A represents a construction of an optical head employed in this information processing apparatus. This optical head is arranged by an object lens 25 with an actuator for focusing the laser light onto the optical recording medium and also for tracking this laser light; a ¼ wavelength plate 27; a polarized beam splitter 28; an opto-acoustic element 29; a Foucault prism 30; a condenser lens 31; a position sensor 32; a beam shaping prism 33; a collimeter lens 34; a laser diode 35; and an operational amplifier 36. When the light returned from the optical memory medium 26 is returned to the polarized beam splitter 28, an optoacoustic voltage proportional to an amount of the returning light is outputted from the opto-acoustic element 29. This output voltage is differential-detected by the operational amplifier 36 so as to control the laser power output of the laser diode 35 via a servo loop 37. It is so designed that the reflectivity fluctuation caused from the optical memory is continuously mitigated by the servo control loop defined by 29 to 35. It should be designed that the laser power control servo system is not operative during the recording and reproducing operations of the optical memory, as shown in FIG. 24B. This is because the reflectivity fluctuation during the data reproducing operation is distinguishable from the change in the reflection amount caused when the laser power is increased during the recording operation. As a consequence, as represented in FIG. 24B, the laser power control servo system is operated only when both the focusing and tracking servo systems are in an operative condition. As the optoacoustic element, a pyroelectric substance such as PZT, $LiNbO_3$ and ZnO may be used.

FIG. 25 shows a schematic block diagram of one arrangement of the information processing apparatus constructed of an optical memory 38 including an optical disk 3; an optical head 39; a motor 40 for rotating the optical disk; a drive circuit 41 for driving both the optical head and motor; a processor 43 for recording the data, for processing the reproduced data, and for managing output/input of the data; input means 44 such as a keyboard; and, output means 42 such as a CRT. It should be noted that the optical memory 38 is provided within this information processing apparatus and has flexibility.

What is claimed is:

1. An optical memory comprising:
   a case having an upper wall and a lower wall, said upper wall having at least a portion which is transparent to light;
   an optical recording medium rotatably disposed within said case so as to receive light which is transmitted through said transparent portion for recording or reproducing information on or from said medium; and
   an antireflection film formed on at least one of a lower surface of said upper wall of said case and a surface of said optical recording medium which faces said upper wall of said case.

2. An optical memory as claimed in claim 1, wherein said antireflection film is formed on a surface of said transparent portion of said case.

3. An optical memory as claimed in claim 2, wherein said antireflection film has a refractive index $n=\sqrt{n_0 n_1}$, where $n_0$ is the refractive index of an air space disposed between said case and said optical recording medium, and $n_1$ is the refractive index of the transparent portion of said case.

4. An optical memory as claimed in claim 1, wherein said antireflection film is made of a material, through which light is more easily passable, as compared with the material of said case and said optical recording medium.

5. An optical memory as claimed in claim 1, wherein said antireflection film has a light transmittance higher than that of said case and said optical recording medium.

6. An optical memory as claimed in claim 1, wherein the light transmittance of said antireflection film is higher than 80%.

7. An optical memory as claimed in claim 1, wherein the light transmittance of the transparent portion of said case is higher than 80%.

8. An optical memory as claimed in claim 1, wherein the transparent portion of said case is made of a material, through which light is more easily passable, as compared with the material of said case and said optical recording medium.

9. An optical memory as claimed in claim 1, wherein said optical recording medium includes a recording layer formed on a substrate.

10. An optical memory as claimed in claim 1, wherein said antireflection film is formed on said surface of said optical recording medium.

11. An optical memory as claimed in claim 10, wherein said antireflection film has a refractive index $n=\sqrt{n_0 n_2}$, wherein $n_0$ is the refractive index of an air space disposed between said case and said optical reading medium, and $n_2$ is the refractive index of the optical recording medium in contact with said antireflection film.

12. An optical memory as claimed in claim 1, further comprising a first antireflection film formed on a surface of said transparent portion of said case and a second antireflection film formed on said surface of said optical reading medium.

13. An optical memory as claimed in claim 12, wherein said first antireflection film has a refractive index $n_3=\sqrt{n_0 n_1}$, and said second antireflection film has a refractive index $n_4=\sqrt{n_0 n_2}$, wherein $n_0$ is the refractive index of an air space disposed between said case and said optical reading medium, $n_1$ is the refractive index of the transparent portion of said case, and $n_2$ is the refractive index of the optical reading medium in contact with said antireflection film.

14. An optical memory as claimed in claim 1, wherein said antireflection film satisfies the condition that $n \times h = (2m+1)\lambda 4$, where $\lambda$ is the wavelength of light used in recording or reproducing information on said optical recording medium, $n$ is the refractive index of the antireflection film, $h$ is the thickness of said antireflection film and $m$ is an integer.

15. An optical memory as claimed in claim 1, wherein said antireflection film is a multilayer film.

16. An optical memory comprising:
   a case having an upper wall and a lower wall, said upper wall having at least a portion which is transparent to light;
   an optical recording medium rotatably disposed within said case so that an air layer is formed between said case and said optical recording medium, and said optical recording medium being rotatably disposed within said case so as to receive light which is transmitted through said transparent portion for recording or reproducing information on or from said medium; and
   antireflection means, disposed on a surface of said optical recording medium so that a first boundary plane is formed between the optical recording medium and the air layer or a surface of the transparent portion of the case so that a second boundary plane is formed between the transparent portion of the case and the air layer, for establishing a reflectivity at said first or said second boundary plane which is lower than 4%.

17. An information processing apparatus, comprising:
   a memory which includes an optical recording medium rotatably disposed within a case having an upper wall, a lower wall and a transparent portion disposed in said upper wall and an antireflection film formed on at least one of a surface of said transparent portion of said upper wall of said case and an upper surface of said optical recording medium; and
   an optical head for recording information on said optical recording medium, for reproducing information from the optical recording medium or for erasing the recorded information on the optical recording medium by transmitting light through said antireflection film onto said optical recording medium.

18. An information recording and reproducing method for performing at least one of information recording, reproducing and erasing operations, with respect to an optical recording medium rotatably disposed within a case, said case having an upper wall, a lower wall and a transparent portion disposed in said upper wall, by irradiating light thereon through the transparent portion onto the recording medium, comprising the steps of:
   irradiating the light which is transmitted through the transparent portion onto said optical recording medium through an antireflection film formed on at least one of a surface of said transparent portion of said case and a surface of said optical recording medium facing said upper wall of said case.

19. An optical memory comprising:

a case having an upper wall and a lower wall, said upper wall having at least a transparent portion therein;

an optical recording medium rotatably mounted within the case so as to receive light for recording or reproducing information through said transparent portion; and a film for suppressing interference of light occurring in an air layer formed between the upper wall of said case and an upper surface of the optical recording medium, said film being formed on at least one of a lower surface of the upper wall of the case and the upper surface of the optical recording medium.

20. An optical memory as claimed in claim 19, wherein said film is provided on at least one of a surface of said transparent portion of said upper wall of said case in contact with said air layer and the upper surface of the optical recording medium in contact with said air layer.

21. An optical memory as claimed in claim 19, wherein said film is made of a material having a refractive index different from that of said case and of said optical recording medium.

22. An optical memory as claimed in claim 19, wherein said film is made of a material having a light transmittance greater than that of said case and of said optical recording medium.

23. An information processing apparatus, comprising:

an optical memory in which an optical recording medium for optically recording, reproducing or erasing information is movably stored within a case having an upper wall, a lower wall and a transparent portion disposed in said upper wall;

an optical head for recording the information on the optical recording medium, for reproducing the information from the optical recording medium or for erasing the information recorded on the optical recording medium by transmitting light through said transparent portion of said case onto said optical recording medium;

means, disposed on at least one of a surface of said upper wall of said case and an upper surface of said optical recording medium, for setting a variation in a reflecting amount of light reflected from the optical recording medium to lower than 5 percent;

means for rotatably driving the optical recording medium; and a drive circuit for controllably driving an operation of the optical head and the drive means.

* * * * *